(12) United States Patent
Sacks et al.

(10) Patent No.: US 6,480,353 B1
(45) Date of Patent: Nov. 12, 2002

(54) FIXED DISC DRIVE CARTRIDGE AND PLAYBACK DEVICE

(75) Inventors: Alexei Hiram Sacks, Edina, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/479,769

(22) Filed: Jan. 7, 2000

Related U.S. Application Data

(60) Provisional application No. 60/121,142, filed on Feb. 22, 1999.

(51) Int. Cl.$^7$ .............................................. G11B 5/596
(52) U.S. Cl. .................................. 360/97.02; 360/97.03
(58) Field of Search ........................... 360/97.01, 97.03, 360/98.01, 97.02

(56) References Cited

U.S. PATENT DOCUMENTS

| | | | | |
|---|---|---|---|---|
| 4,149,201 A | * | 10/1979 | Card ............................. 360/77 |
| 4,639,863 A | * | 1/1987 | Harrison et al. ............. 364/200 |
| 4,647,997 A | * | 3/1987 | Westwood ................ 360/256.1 |
| 4,833,554 A | * | 5/1989 | Dalziel et al. ................ 360/69 |
| 5,010,426 A | * | 4/1991 | Krenz ......................... 360/137 |
| 5,243,495 A | * | 9/1993 | Read et al. ............... 360/97.01 |
| 5,253,129 A | * | 10/1993 | Blackborow et al. ......... 360/69 |
| 5,329,412 A | * | 7/1994 | Stefansky ................ 360/256.2 |
| 5,331,488 A | | 7/1994 | McAllister et al. ...... 360/98.08 |
| 5,444,586 A | | 8/1995 | Iftikar et al. ............. 360/99.12 |
| 5,625,777 A | * | 4/1997 | Takahashi et al. .......... 395/283 |
| 5,668,682 A | | 9/1997 | Matsumoto .................. 360/105 |
| 5,691,860 A | | 11/1997 | Hoppe ..................... 360/97.02 |
| 5,703,857 A | * | 12/1997 | Davis et al. ............... 369/77.2 |
| 5,751,514 A | * | 5/1998 | Hyde et al. ............... 360/97.01 |
| 5,757,582 A | * | 5/1998 | White et al. .............. 360/98.01 |
| 5,835,343 A | * | 11/1998 | Johns et al. ................. 361/681 |
| 5,872,676 A | * | 2/1999 | Smith et al. .............. 360/77.03 |
| 5,930,074 A | | 7/1999 | Nicklos .................... 360/99.06 |
| 5,948,092 A | * | 9/1999 | Crump et al. ............... 360/135 |
| 5,978,752 A | * | 11/1999 | Morris ....................... 702/186 |
| 6,025,988 A | * | 2/2000 | Yan ............................ 361/685 |
| 6,069,766 A | * | 5/2000 | Battu et al. .............. 360/97.01 |
| 6,078,465 A | * | 6/2000 | Kodama ................... 360/97.01 |
| 6,108,162 A | * | 8/2000 | Amirkiai ................... 360/97.01 |
| 6,211,638 B1 | * | 4/2001 | Heaton et al. .............. 318/560 |

FOREIGN PATENT DOCUMENTS

| | | | |
|---|---|---|---|
| JP | 363098721 A | * | 4/1988 |
| JP | 407296444 A | * | 11/1995 |
| JP | 408306178 A | * | 11/1996 |

OTHER PUBLICATIONS

Castlewood Systems, ORB Mr Technology, printed from website (www.castlewood.com), on Jun. 28, 1999.

* cited by examiner

*Primary Examiner*—Brian E. Miller
(74) *Attorney, Agent, or Firm*—Westman, Champlin & Kelly, P.A.

(57) ABSTRACT

A data storage system is disclosed which provides a sealed fixed disc drive cartridge and related playback device. The cartridge includes at least one rotatable fixed disc and a head disposed proximate the disc to at least read data from the disc. A first actuator is operably coupled to the at least one head and is adapted to move the head relative to the disc. A first connector is operably coupled to the head and to the first actuator. The playback device includes read/write circuitry, input and output ports, a controller, a motor driver, and a second connector that is adapted to mate with the connector of the drive cartridge. Preamp circuitry is operably disposed between the at least one head and the read/write circuitry. The data storage system can provide fixed drive performance and characteristics while also providing the advantages of the removable media drive system.

14 Claims, 3 Drawing Sheets

FIXED DISC DRIVE CARTRIDGE AND PLAYBACK DEVICE

CROSS-REFERENCE TO CO-PENDING APPLICATION

This application claims the priority of an earlier filed co-pending provisional patent application Ser. No. 60/121,142, filed Feb. 22, 1999 entitled FIXED DISC DRIVE CARTRIDGE AND PLAYBACK DEVICE.

FIELD OF THE INVENTION

The present invention relates generally to removable data storage devices. More particularly, the present invention relates to a removable fixed disc drive cartridge and associated playback device.

BACKGROUND OF THE INVENTION

Mass storage devices are one of many components of modern computers, such as the personal computer (PC). One type of mass storage device is the fixed disc drive. Such drives are used to store operating systems, applications, and user data. As PC's become less expensive, storage devices must follow suit. Low cost storage devices are currently being driven by the sub-$1000 PC market, and will soon be driven by the sub-$500 PC market. The drives that will be incorporated into such systems will need to cost on the order of about 12% of the total system cost. Thus, there is a current need to provide a low cost fixed disc drive.

One way that users sometimes increase the storage capacity of their systems is by using removable media storage devices, such as floppy disc drives, tape drives, CD-ROM drives, DVD-ROM drives, and removable media fixed disc drives. Generally, the flexibility of removable media storage devices requires the user to sacrifice performance as compared to a standard fixed disc drive. For example, CD-ROM's currently provide about 630 megabytes of storage capacity, and CD-ROM drives are able to read data at a speed of about 6 megabytes/second. A removable media hard drive known as the ORB™, available from Castlewood Systems Inc., of Pleasanton, Calif., provides storage capacity of 2.2 gigabytes per disk, and the playback device is able to read data from the disk at a rate of about 12.2 megabytes/second. In contrast, current fixed disc drives provide data capacity in excess of 50 gigabytes, and transfer rates in excess of 22 megabytes/second. Thus, there is also a need to provide a removable media storage system having the performance of standard fixed disc drives.

Providing such performance in a removable storage device is becoming increasingly important as new uses are found for the personal computer. For example, streaming audio and video files are routinely transferred over the internet. Such data streams can often consume large amounts of storage capacity. Other forms of data, whether digital, or analog, are now transferred using cable, satellites, and the television broadcast spectrum. Recently, digital video recorders have entered the consumer electronics market, allowing users to essentially time-shift selected broadcasts. These devices use fixed disc drives to essentially function as a video cassette recorder. Providing a removable media drive for such application would allow users to save stored broadcasts as easily as videotapes are currently stored. Thus, there is also a need outside of the personal computer market for low-cost, high performance removable media drives.

The present invention addresses these and other problems, and offers other advantages over the prior art.

SUMMARY OF THE INVENTION

The present invention relates to removable fixed media storage devices which solve the above-mentioned problems.

In accordance with one embodiment of the invention, a removable fixed disc cartridge and related playback device are disclosed. The fixed disc cartridge is sealed from the environment, and includes at least one rotatable fixed disc and at least one related head. The cartridge is removably coupleable to the playback device, and provides traditional fixed disc drive characteristics and functions when so coupled.

DETAILED DESCRIPTION OF ILLUSTRATIVE EMBODIMENTS

Figure 1:
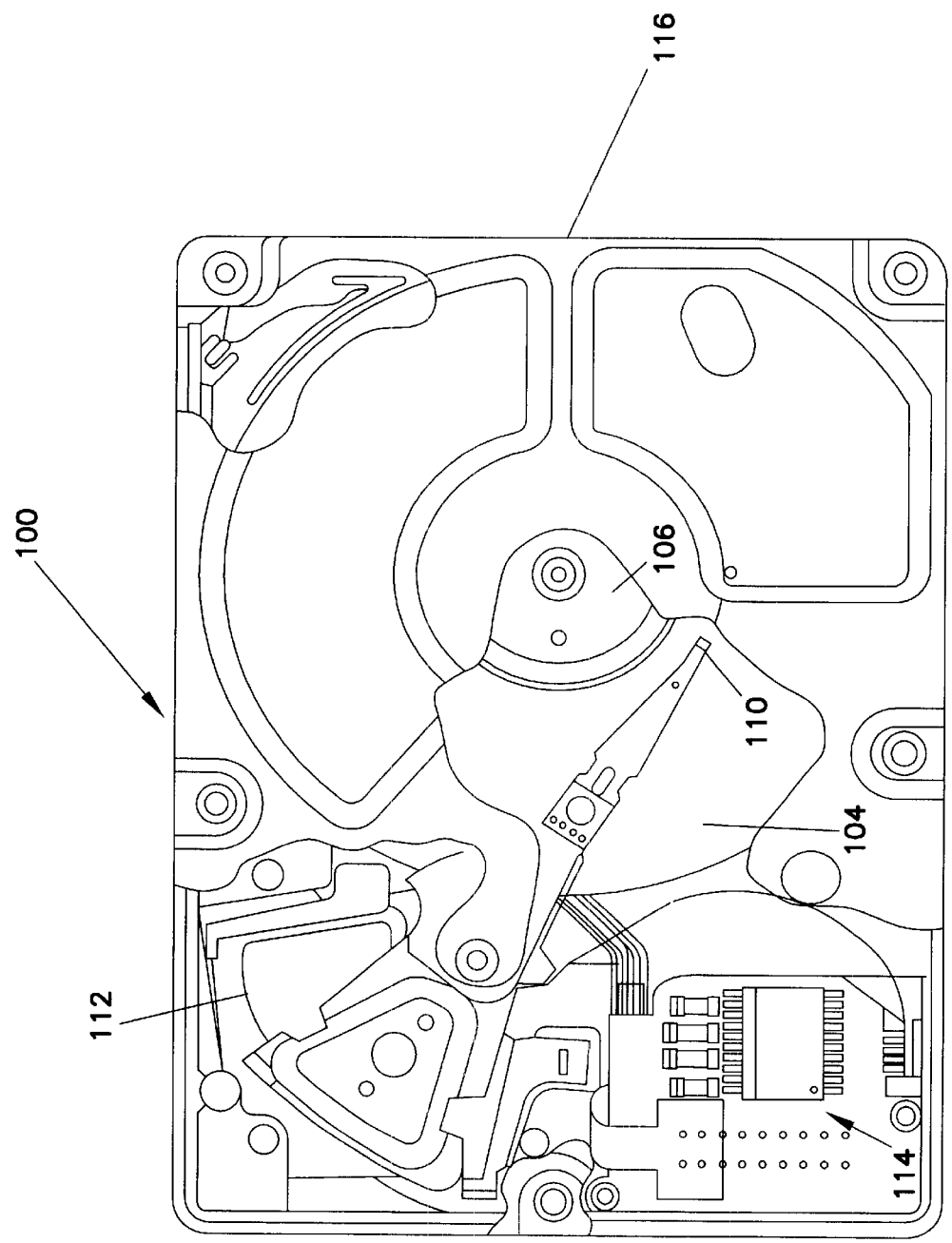
FIG. 1 is a diagrammatic view of a storage drive of the prior art.

FIG. 1 is a diagrammatic view of storage drive 100 in accordance with the prior art. Storage drive 100 is coupled to a computer (not shown) such that the computer transfers data to and reads data from storage drive 100. Storage drive 100 includes disc 104, spindle 106, a spindle motor (not shown), head 110, actuator 112, and board electronics 114.

Disc 104 is fixed about spindle 106. Spindle 106 is coupled to the spindle motor such that energization of the spindle motor causes spindle 106 and disc 104 to rotate. When disc 104 rotates, head 110 flies above disc 104 and is magnetically or optically coupled to the surface of disc 104. Actuator 112 is coupled to board electronics 114 and is adapted to move head 110 relative to the surface of disc 104 in response to an actuation signal from board electronics 114.

Enclosure 116 is sealed from the outside environment such that the environment within enclosure 116 can be maintained substantially free of debris and other undesirable particulate matter. By so maintaining the interior of enclosure 116, head 110 can be allowed to fly very close to, and sometimes contacting, the surface of disc 104. Such close proximity between head 110 and disc 104 provides the enhanced storage characteristics of traditional fixed disc drives. Moreover, since head 110 rides upon a thin film of air, disc 104 can be rotated at a high rate and the undesirable effects of friction between the transducer element and the disc are substantially non-existent. This is in contrast to other types of storage media where the transducer directly contacts the media. Thus, the particular configuration of a transducer head flying adjacent a disc in a sealed environment facilitates the provision of high data capacities and transfer rates of traditional fixed disc drives.

As individual disc drives become obsolete, generally due to their limited capacity, a user may replace the drive, or add an additional fixed disc drive to a system. In either case, the user generally must purchase an entire fixed disc drive. One feature of embodiments of the present invention is providing a sealed fixed disc cartridge without associated board electronics, and making such cartridge couplable to a playback device having the board electronics. By so constructing a storage device in accordance with the present invention, cartridges can not only be replaced as they become obsolete (at lesser cost that that of an entire disc drive) but additional cartridges can be acquired and treated as removable storage media. Thus, removable storage media devices in accordance with the present invention can offer the advantageous performance characteristics of traditional fixed disc drives while also providing the features of removable storage media.

Figure 2:
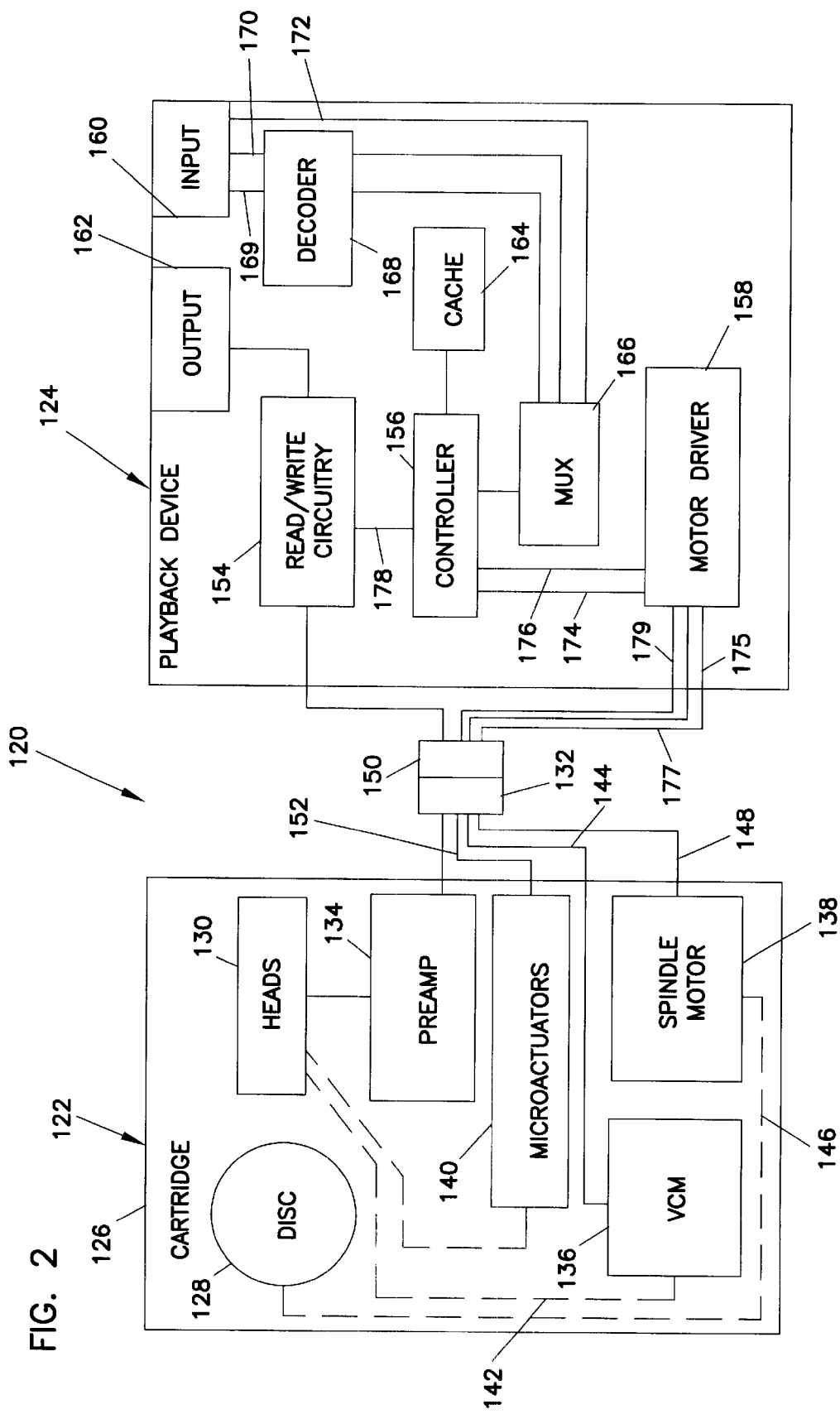
FIG. 2 is a system block diagram of a removable media storage system in accordance with the present invention.

FIG. 2 is a system block diagram of data storage system 120 in accordance with the present invention. Storage system 120 includes removable fixed disc cartridge 122 and playback device 124. When coupled together, cartridge 122 and playback device 124 functionally comprise a fixed disc drive, offering all of the advantages and characteristics of fixed disc drives.

Cartridge 122 includes sealed enclosure 126, rotatable fixed disc 128, heads 130 and connector 132. Optionally, cartridge 126 can also include preamp circuitry 134, actuator 136 (labeled VCM), spindle motor 138, and microactuators 140.

Sealed enclosure 126 is sealed from the environment such that the interior of enclosure 126 is maintained in a clean condition to facilitate flight of heads 130 in very close proximity to disc 128. As used herein, "sealed" is intended to mean permanently sealed, such as the manner in which traditional fixed disc drives are sealed. Enclosure 126 can be constructed from carbon composite material, injection moldable plastic, or any other suitable material. Preferably, enclosure 126 is constructed in a manner to facilitate low cost manufacture, such as with injection molding or casting techniques.

Disc 128 is rotatably disposed within sealed enclosures 126, and is adapted to store data in accordance with known techniques such as magnetic, magneto-optical, and optical techniques. Disc 128 can be a known fixed disc. Additionally, disc 128 can be constructed, in part, from aluminum or glass. Moreover, some plastics can be used, in part, to construct disc 128, which may reduce costs. Disc 128 can be constructed to be thicker than traditional fixed discs in order to enhance rigidity. For example, while typical fixed discs have a thickness ranging between about 0.80 millimeters and 1.27 millimeters, a disc in accordance with the present invention can be 2.5 millimeters thick, or thicker. Disc 128 is shown schematically in FIG. 2 and can, in actuality, comprise a number of actual fixed discs.

Heads 130 are disposed within sealed enclosure 126 relative to disc 128 such that heads 130 are operatively coupled to disc 128 for reading and optionally writing data. Generally, since each surface of an individual disc 128 is used for data storage, two heads 130 will be utilized for each individual disc 128. Heads 130 are adapted to operate with disc 128 in accordance with the specific data storage technology used for disc 128, such as magnetic, magneto-optical, or optical techniques. Heads 130 are coupled to preamp 134 such that signals indicative of data read from disc 128 by heads 130 can be suitably amplified before being transmitted to further electronics. Preferably, preamp 134 is disposed as close to heads 130 as possible. Thus, in some embodiments, preamp 134 is disposed within sealed enclosure 126 (such as that shown in FIG. 2). To enhance ruggedness, heads 130 can be loaded to disc 128 for operation, and unloaded during periods of nonuse.

Actuator 136 can optionally be disposed within sealed enclosure 126 and can be a rotary or linear actuator. Actuator 136 is operatively coupled to heads 130 as indicated by dashed line 142 such that heads 130 are moved relative to disc 128 in response to an actuation signal received by actuator 136 through line 144. Preferably, actuator 136 is a rotary actuator known as a voice coil motor (VCM). Microactuator 140 can optionally be included within cartridge 122 to provide relatively small movement of heads 130 in response to a microactuator energization signal.

Spindle motor 138 is preferably disposed within sealed enclosure 126 and is operatively coupled to disc 128, as indicated by broken line 146. Spindle motor 138 is preferably of the type known in the art, and is adapted to rotate disc 128 in response to an energization signal received through line 148 from connector 132. In embodiments where spindle motor 138 is not disposed within sealed enclosure 126, spindle motor 138 can comprise part of playback device 124 in which spindle motor 138 operably couples to disc 128 when connector 132 of cartridge 122 engages connector 150 of playback device 124.

Playback device 124 includes read/write circuitry 154, controller 156, motor driver 158, input 160 and output 162. Optionally, playback device 124 can include cache memory 164, multiplexer 166, and decoder 168.

Read/write circuitry 154 is couplable to preamp 134. Preferably, read/write circuitry 154 is couplable to preamp 134 through connectors 150, 132. When so coupled, read/write circuitry 154 communicates with preamp 134 to receive data read from disc 128, or send data to be written to disc 128. Read/write circuitry 154 provides data read from disc 128 to output 162, which output is couplable to a host device such as a personal computer, or consumer electronics product. Read/write circuitry 154 can be any suitable circuitry capable of cooperating with a preamplifier, such as preamp 134, to read data from, or write data to a disc. Read/write circuitry 154 can thus be read/servo channel circuitry. Known read/write circuitry is currently available from companies such as Texas Instruments, and Lucent.

Controller 156 is coupled to read/write circuitry 156, and operatively coupled to input 160. In the embodiment shown in FIG. 2, controller 156 is coupled to input 160 through multiplexer 166, which couples controller 156 to input lines 169, 170, 172. Input 160 receives input data, in analog or digital form, and provides the input data to controller 156. Controller 156 sends the input data to read/write circuitry 154 to be written upon disc 128. Controller 156 is also coupled to motor driver 158 through track addressing line 174 and spindle speed line 176. By sending appropriate commands through lines 174, 176, controller 156 causes motor driver 158 to adjust VCM actuation, spindle speed, or both. Controller 156 can be any suitable device, including known controllers.

Motor driver 158 is couplable to spindle motor 138, actuator 136, and microactuator 140 preferably through connectors 150, 132. Motor driver provides energization signals to spindle motor 138 through line 175, to actuator 136 through line 177, and to microactuator 140 through line 179 in response to commands received from controller 156 through lines 176 and 174. By applying suitable energization signals to spindle motor 138, driver 158 is able to control the speed at which spindle motor 138 rotates disc 128. Similarly, by applying suitable energization signals to actuator 136 and optional microactuator 140, driver 158 can control the placement of heads 130 relative to the surface of disc 128. Preferably, motor driver 158 is of the type known in the art.

Playback device 124 can include cache memory 164. Memory 164 is coupled to controller 156 to allow controller 156 to temporarily store input data prior to writing the input data to disc 128. Using cache memory 164 allows playback device 124 to potentially receive input data at a rate that temporarily exceeds the rate at which data can be written to disc 128. Further, employing cache memory 164 potentially allows playback device 124 to receive input data, while system 120 is performing additional functions. Further still, if cache memory 164 is of suitable size, playback device 124 may even receive some data when playback device 124 is not even connected to cartridge 122. Preferably, cache memory 164 is random access memory (RAM) of known type.

Playback device 124 optionally includes multiplexer 166 to allow controller 156 to receive data from a plurality of data streams. Multiplexer 166 is preferably of conventional design, and selectably couples controller 156 to one of input lines 169, 170, and 172, based upon one or more commands from controller 156. The input data streams can include analog or digital data streams. Examples, of analog data include analog video signals, analog audio signals, and analog data signals in general. Examples of digital data include digital data, such as that used with a personal computer, digital audio data, and digital video data. As illustrated, input 160 of playback device 124 is adapted to receive analog data through lines 169, and 170, and to receive digital data through line 170, however any number of analog and digital input lines can be used. Analog lines 169 and 170 are coupled to decoder 168 to convert the analog data into digital form. Thus, all data arriving at controller 156 is preferably in digital form. In some embodiments, playback device 124 can receive multiple inputs substantially simultaneously, and record data from the various inputs upon disc 128.

Each of cartridge 122 and playback device 124 can be configured such that when coupled together, they fit within the space constraints of a standard 3½" or 5¼" personal computer drive bay. Thus, system 120 can be mounted as a standard personal computer component. Additionally, playback device 124 can be incorporated into consumer electronics devices to provide recording and playback of digital data. Examples of such consumer electronics devices include personal digital video recorders, digital video cameras, and digital cameras.

Figure 3:
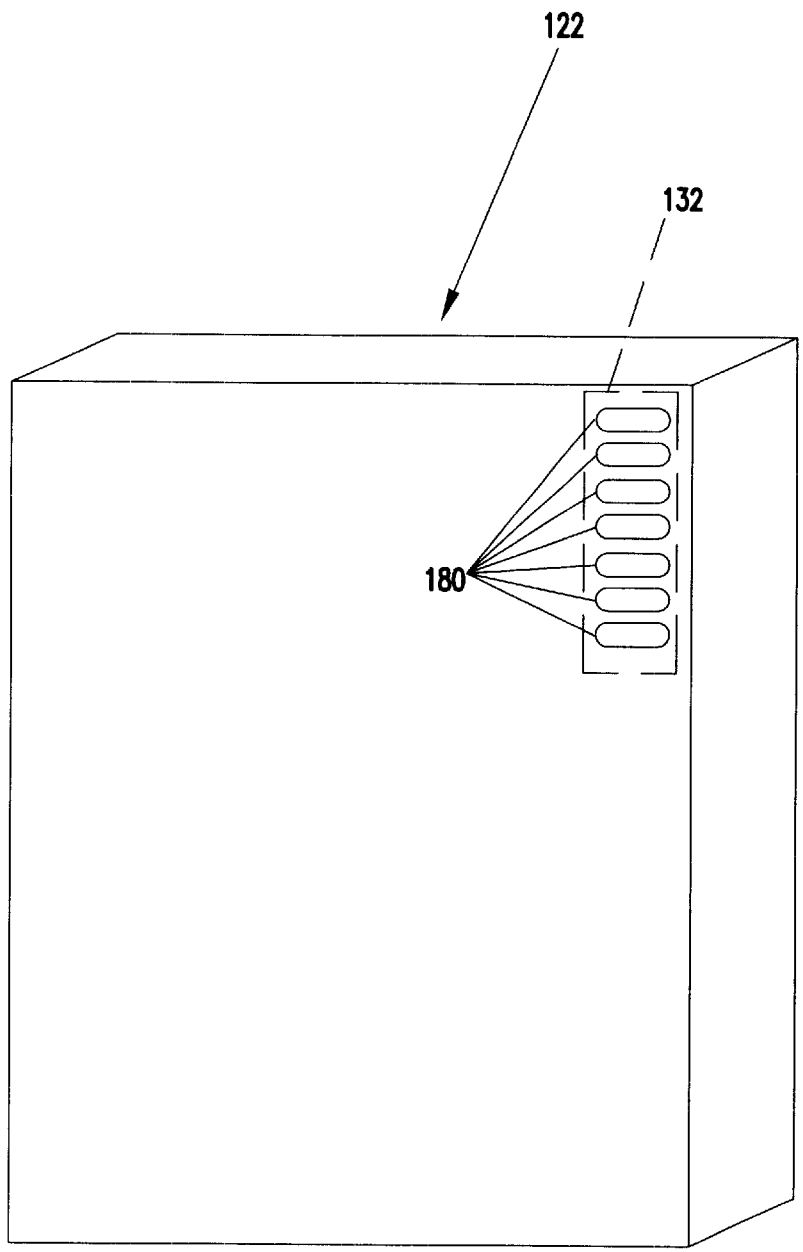
FIG. 3 is a perspective view of a fixed disc cartridge in accordance with an embodiment of the present invention.

FIG. 3 is a perspective view of one embodiment of cartridge 122 in accordance with the present invention. As can be seen, connector 132 of cartridge 122 can include a plurality of contact pads 180 disposed on a front surface of cartridge 122. In this embodiment, pads 180 are contacted by mating conductors in connector 150 of playback device 124. The embodiment shown in FIG. 3 is for illustration purposes only, since a wide variety of connection techniques and methodologies may be used to create connector 132, connector 150, or both. Furthermore, connectors 132 and 150 can be adapted to cooperate in such a manner that cartridge 122 can be locked into playback device 124.

In conclusion, a data storage system 120 is disclosed including a sealed fixed disc drive cartridge 122 and related playback device 124. The cartridge 122 includes at least one rotatable fixed disc 128 disposed within the enclosure 126, and at least one head 130 disposed within the enclosure 126 that is moveable relative to the disc 128 such that data can at least be read from the disc 128. The disc cartridge 122 also includes a connector 132, which is electrically coupled to the head 130 and disposed to mate with a mating connector 150 on the playback device 124. The cartridge 122 can include more than one fixed disc 128, and the discs 128 themselves can be constructed from any suitable material including aluminum, glass, or plastic. One or more actuators 136, 140 can be provided within the sealed enclosure 126 to move the head 130 relative to the disc 128. The sealed cartridge 122 can be constructed in a known manner from materials such as carbon composite or injection moldable plastic. The disc 128 within cartridge 122 can be adapted to store data magnetically, magneto-optically, or optically. Finally, cartridge 122 can optionally include preamp circuitry 134 and a spindle motor 138

The playback device 124 generally includes read/write circuitry 154, input and output ports 160, 162, a controller 156, a motor driver 158 and a second connector 150, which is matable with the cartridge connector 132. The playback device 124 can optionally include preamp circuitry 134 in embodiments where preamp circuitry 134 is not included within the disc cartridge 122. The playback device 124 can optionally also include cache memory 164, a multiplexer 166, and a decoder 168 such that the playback device 124 can read and/or write multiple data streams. Thus, a device 120 in accordance with the present invention can seemingly simultaneously record digital audio from one stream, video from another stream, and data from yet another stream.

Although the present invention has been described with reference to particular embodiments, workers skilled in the art will recognize that changes may be made in form and detail without departing from the spirit and scope of the invention.

It is to be understood that even though numerous characteristics and advantages of various embodiments of the present invention have been set forth in the foregoing description, together with details of the structure and function of various embodiments of the invention, this disclosure is illustrative only and changes may be made in detail, especially in matters of structure and arrangement of parts within the principles of the present invention to the full extent indicated by the broad general meaning of the terms in which the appended claims are expressed. For example, the particular elements may vary depending on the particular application for the removable fixed disc drive while maintaining substantially the same functionality without departing from the spirit and scope of the present invention.

What is claimed is:

1. A data storage system comprising:
    a removable sealed fixed disc drive cartridge, including:
        a sealed enclosure;
        at least one rotatable fixed disc;
        at least one head disposed proximate the disc to at least read data from the disc during disc rotation;
        a first actuator operably coupled to the at least one head, and adapted to move the at least one head relative to the at least one disc;
        a first connector operably coupled to the at least one head and to the first actuator;
    a playback device including:
        read/write circuitry;
        an at least one input port operably coupled to a host device to receive and provide input data;
        an output port operably coupled to the read/write circuitry to provide data read from the at least one disc;
        a controller operably coupled to the input port and the read/write circuitry;
        a motor driver operably coupled to the controller; and
        a second connector operably coupled to the read/write circuitry, and to the motor driver, the second connector being operably engageable with the first connector to thereby operably couple the read/write circuitry to the at least one head and to operably couple the motor driver to the first actuator;
    a spindle motor operably coupled to the motor driver and operably coupled to the at least one fixed-disc to rotate the at least one fixed disc;

a multiplexer electrically interposed between the input port and the controller, and wherein the multiplexer is adapted to provide a selected one of a plurality of data streams received from the input port to the controller; and preamp circuitry disposed within the removable, sealed fixed disc drive cartridge operably coupleable to the at least one head and to the read/write circuitry.

2. The system of claim 1, and further comprising a second actuator coupled to the at least one head, and operably coupleable to the motor driver through the first and the second connectors, the second actuator being a microactuator adapted to displace the at least one head in response to reception of a microactuator energization signal.

3. The system of claim 1, wherein the playback device further comprises cache memory coupled to the controller.

4. The system of claim 1, wherein the selected one of a plurality of data streams comprises analog data, and wherein the playback device further comprises a decoder operably coupled to the multiplexer and the input to decode the analog data.

5. The system of claim 1, wherein the at least one fixed disc comprises a plurality of fixed discs disposed concentrically with respect to one another.

6. The system of claim 1, wherein the removable sealed fixed disc drive cartridge further comprises a second actuator disposed within the enclosure, the second actuator being a microactuator electrically coupled to the connector, and operably coupled to the head to move the head relative to the at least one fixed disc.

7. The system of claim 1, wherein the first actuator is a rotary voice coil motor.

8. The system of claim 1, wherein the enclosure is constructed from a carbon composite material.

9. The system of claim 1, wherein the enclosure is injection molded.

10. The system of claim 1, wherein the at least one fixed disc at least partially comprises aluminum.

11. The system of claim 1, wherein the at least one disc at least partially comprises glass.

12. The system of claim 1, wherein the first connector comprises a plurality of electrically conductive pads disposed on the exterior of the enclosure.

13. The system of claim 1, wherein the at least one disc is adapted to store data magnetically.

14. The system of claim 1, wherein the disc is adapted to store data magneto-optically.

* * * * *